United States Patent [19]

Manschitz

[11] Patent Number: 4,775,160

[45] Date of Patent: Oct. 4, 1988

[54] CLAMPING CHUCK FOR DRILL BITS AND CHISEL BITS

[75] Inventor: Erwin Manschitz, Germering, Fed. Rep. of Germany

[73] Assignee: Hilti Aktiengesellschaft, Liechtenstein

[21] Appl. No.: 903,415

[22] Filed: Sep. 3, 1986

[30] Foreign Application Priority Data

Sep. 4, 1985 [DE] Fed. Rep. of Germany ....... 3531512

[51] Int. Cl.⁴ .............................................. B23B 31/04
[52] U.S. Cl. .......................................... 279/74; 279/60
[58] Field of Search ....................... 279/69, 70, 74, 60, 279/63, 64, 65

[56] References Cited

U.S. PATENT DOCUMENTS

| | | | |
|---|---|---|---|
| 662,535 | 11/1900 | Jenkins | 279/60 X |
| 1,233,921 | 7/1917 | Ross | 279/74 |
| 1,497,483 | 6/1924 | Callender et al. | 279/69 X |
| 2,430,761 | 11/1947 | Duphily | 279/74 |
| 3,039,341 | 6/1962 | Stieglitz | 279/60 X |
| 4,121,848 | 10/1978 | Morawski | 279/60 |
| 4,508,180 | 4/1985 | Klueber | 279/64 X |

Primary Examiner—Z. R. Bilinsky
Attorney, Agent, or Firm—Toren, McGeady & Associates

[57] ABSTRACT

A clamping chuck for securing a drill bit, chisel bit or the like in a drilling tool includes a guide sleeve into which the bit is inserted. Clamping jaws are radially displaceably mounted in the guide sleeve with a setting sleeve encircling the jaws. By axially displacing the setting sleeve relative to the guide sleeve the jaws can be radially displaced in gripping engagement with the bit. The setting sleeve has radially inwardly facing surfaces in contact with radially outwardly facing surfaces on the jaws. Retaining elements secured in the setting sleeve engage in slots in the jaws for guiding the jaws. The retaining elements can be strip-like elements extending through the slots in the jaws with the elements having a thickness corresponding to the slot width.

7 Claims, 1 Drawing Sheet

CLAMPING CHUCK FOR DRILL BITS AND CHISEL BITS

BACKGROUND OF THE INVENTION

The present invention is directed to a clamping chuck for drill bits, chisel bits and the like for use in a drilling tool with clamping jaws radially displaceably mounted in a guide sleeve, and a setting sleeve encircling the jaws and the guide sleeve and being axially displaceable relative to the guide sleeve. The setting sleeve and the clamping jaws have cooperating contacting surfaces inclined obliquely relative to the axis of the guide sleeve.

Chucks of the above type serve to clamp bits in a drilling tool where the bits have shanks of different diameters. The radial adjustment of the jaws is effected by axial displacement of the setting sleeve. The jaws slide relative to the cooperating surfaces on the setting sleeve. Special means are required so that the jaws follow the movement of the setting sleeve during inward or outward displacement.

In known chucks the movement of the clamping jaws is effected by radially pressing the jaws outwardly by means of spring elements against the cooperating surfaces of the setting sleeve. Such spring elements can be pressure springs located between the jaws or in the form of a radially flexible ring extending through the jaws. Since such elements do not provide a positive guidance of the jaws, it is possible that the jaws may become stuck during adjustment due to interference within the chuck caused by drillings or drilling dust becoming lodged between the abutting surfaces of the setting sleeve and the jaws. Apart from the wear caused by such material, such obstruction leads to the unsatisfactory centering of the drill bit.

In other known clamping chucks, positive guidance between the jaws and the setting sleeve is obtained by providing the clamping jaws with a T-shaped cross-section and guiding the jaws in similarly shaped grooves in the setting sleeve. The fabrication of such T-shaped grooves in the setting sleeve is particularly costly especially with smaller sizes of clamping chucks.

SUMMARY OF THE INVENTION

Therefore, the primary object of the present invention is to provide a clamping chuck which can be produced at low cost and in which sufficient guidance of the clamping jaws is assured.

In accordance wth the present invention, the jaws are formed with an elongated slot extending parallel to the abutting surfaces of the jaws and the setting sleeve with retaining elements secured in the setting sleeve and extending into the slots.

Such retention elements can serve as additional guides for the jaws. Accordingly, the construction of the clamping jaws and of the setting sleeve can be considerably simplified. Since the retaining elements serve only for displacement of the clamping jaws and are not stressed to any extent during clamping, the retaining elements and the slots in the jaws can be made relatively small. As a result, reduction in strength of the jaws due to the slots as relatively small.

The slot can be formed only on one side or on both sides of the jaw. For production reasons, it is appropriate if the slot extends completely through the jaw, that is, across the width of the jaw. A slot extending completely through the jaw can be formed in a single operation. Under certain circumstances several jaws can be machined at the one time and this is particularly helpful in obtaining high production accuracy.

For a simple procedure for forming the slots in the jaws, it is advantageous if the slot extends into the jaw from one end. Such a slot extending across the entire width of the jaw can be cut by a single milling cutter. Further, a slot open at the front end of a jaw simplifies the assembly of the jaws in the chuck and also the placement of the retaining element into the slot. The retaining elements can be connected to the setting sleeve by welding, bonding or soldering. It is appropriate for the assembly and disassembly of the chuck, if the retaining elements penetrate into the setting sleeve. Accordingly, the retaining elements can be inserted after the placement of the jaws within the setting sleeve. For replacing the jaws, initially the retaining elements can be removed. The connection of the retaining elements with the setting sleeve can be effected by threaded engagement or by a force or sliding fit.

The retaining elements can be made in different forms. In one advantageous embodiment the retaining element can be formed as a pin with a diameter corresponding substantially to the width of the slot. A portion of the pin can be threaded. The thread facilitates the conneciion of the retaining element with the setting sleeve and also the removal of the element.

In another effective embodiment the retaining element can be formed as a plate-like or strip-like element with a thickness corresponding substantially to the width of the slot. Such a design is particularly useful if the slot extends completely across the width of the jaw. A strip-like retaining element affords larger surface contact with the jaw and thus a more uniform pressure distribution. To avoid damage or wear, the retaining element can be made of a spring steel.

The various features of novelty which characterize the invention are pointed out with particularity in the claims annexed to and forming a part of this disclosure. For a better understanding of the invention, its operating advantages and specific objects attained by its use, reference should be had to the accompanying drawings and descrptive matter in which there are illustrated and described preferred embodiments of the invention.

DETAILED DESCRIPTION OF THE INVENTION

Figure 1:
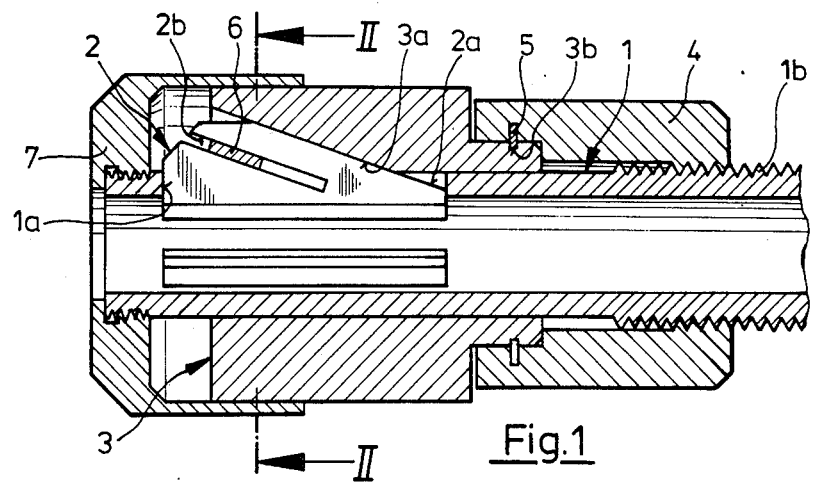
FIG. 1 is an axially extending sectional view of a clamping jaw embodying the present invention.
Figures 2, 4:
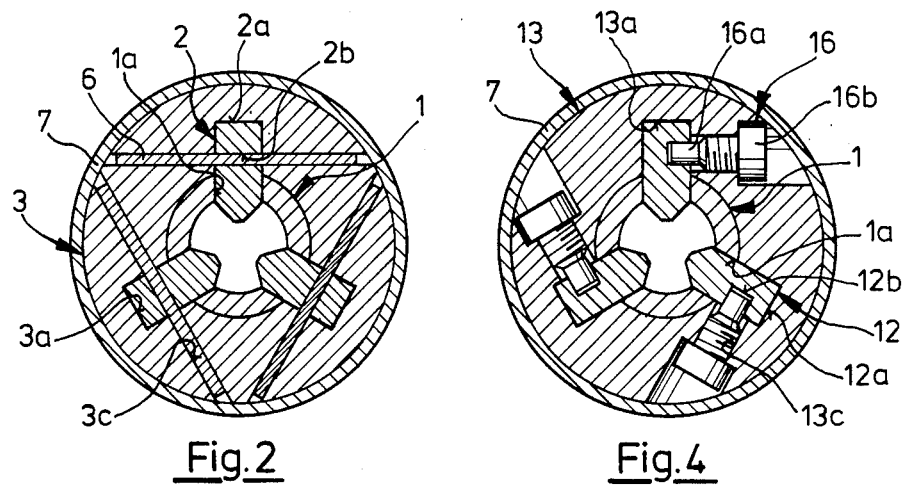
FIG. 2 is a cross-sectional view through the clamping chuck shown in FIG. 1 and taken along the line II—II.
FIG. 4 is a cross-sectional view of the clamping chuck taken along the line IV—IV in FIG. 3.

In FIGS. 1 and 2 an axially extending guide sleeve 1 has an opening at its leadng end, the left-end as viewed in FIG. 1, into which a drill bit, chisel bit or the like can be inserted. Apertures 1a extending in the axial direction of the guide sleeve extend through the guide sleeve and receive radially extending clamping jaws 2. The clamping jaws 2 can be radially displaced through the apertures into clamping engagement with the drill bit, not shown.

The clamping jaws 2 can be adjusted radially by a setting sleeve 3 coaxial with the guide sleeve 1 by axially displacing the setting sleeve reletive to the guide sleeve. Clamping jaws 2 and the setting sleeve 3 each have cooperating contacting surfaces 2a, 3a arranged obliquely relative to the axis of the guide sleeve. Guide sleeve 1 has an axially extending thread 1b on its outer surface as a location spaced from its leading end. A thread sleeve 4 is in threaded engagement with the guide sleeve 1. Threaded sleeve 4 is also connected with the setting sleeve 3 by means of a ring 5 so that the threaded sleeve can be rotated relative to the setting sleeve but is secured to it in an axially stationary manner.

When the threaded sleeve 4 is rotated about the guide sleeve 1, the axial movement of the threaded sleeve is followed by the setting sleeve to that the axial movement of the setting sleeve relative to the guide sleeve effects the axial displacement of the clamping jaws in the radial direction. Each clamping jaw 2 has an elongated slot 2b arranged parallel to the abutting surface 2a. A plate-like or strip-like retaining element 6 has a thickness corresponding substantially to the width of the slot 2b and extends through the slot. As a result, the clamping jaws 2 are secured in a permanent actuating connection with the setting sleeve 3. The slots 2b are open at the leading end of the jaws, that is, the end closer to the leading end of the guide sleeve 1. Further, the slots extend completely through the jaws from one side to the other. Accordingly, the retaining elements 6 are secured in the setting sleeve 3 on the opposite sides of the jaws.

As can be seen n FIG. 2, the retaining elements 6 project outwardly from the jaws into recesses 3c in the setting sleeve. A cap-like cover 7 is screwed onto the leading end of the guide sleeve 1 and forms a closure for the space containing the jaws 2. The cover 7 prevents the passage of any obstructing material into the region of the chuck where the clamping jaws 2 are guided by the settng sleeve 3.

Figure 3:
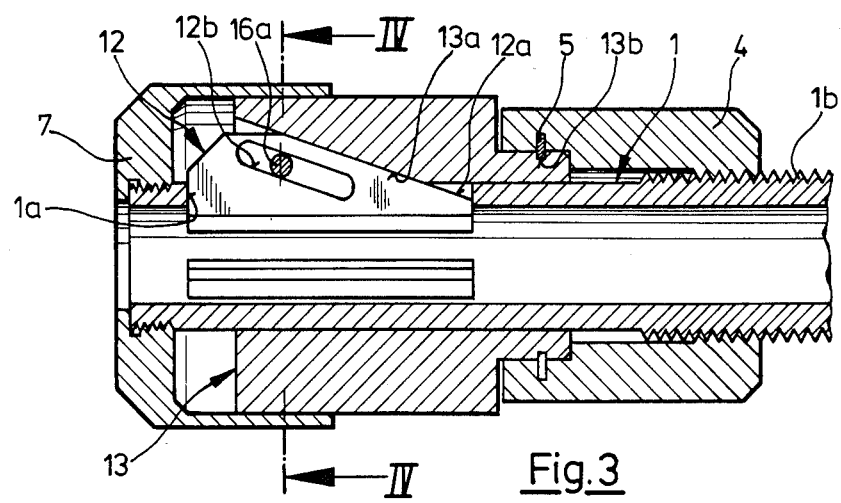
FIG. 3 is an axially extending sectional view similar to FIG. 1 illustrating another embodiment of a clamping chuck incorporating the present invention.

In FIGS. 3 and 4 another embodiment of the present invention is displayed which operates in the same manner as the embodiment set forth in FIGS. 1 and 2. Identical parts are designated with the same reference numerals. As distinguished from the embodiment in FIGS. 1 and 2, clamping jaws 12 each have a slot 12b which does not extend through the leading end of the jaw, that is, the slot is closed ended. Further, the slot, as shown in FIG. 4, extends only into one side of the jaw and does not extend completely through the jaw. A retaining element 16 extends from the setting sleeve 13 into the slot on one side of the clamping jaws 12. The retaining elements 16 have a cylindrical threaded section located between a reduced diameter pin section 1a at one end and a head 16b at the other end. The diameter of the pin section 16a corresponds to the width of the slot 12b on the clamping jaws 12. Head 16b is seated within a bore formed in the setting sleeve inwardly from its outer circumferential surface. This embodiment affords a simple insertion and removal of the retaining elements 16 during the assembly or disassembly of the clamping chuck.

While specific embodiments of the invention have been shown and described in detail to illustrate the application of the inventive principles, it will be understood that the invention may be embodied otherwise without departing from such principles.

I claim:

1. Clamping chuck for securing drill bits, chisel bits or the like in a drilling tool, comprising an axially elongated guide sleeve having a leading end into which a bit is inserted, said guide sleeve has apertures therethrough, clamping jaws mounted in and radially displaceable through the apertures in said guide sleeve, said jaws having a generally axially extending radially inner surface for engaging the bit to be secured and a generally axially extending radially outer surface, a setting sleeve coaxial with and encircling said guide tube and engaging the radially outer surfaces of said clamping jaws for effecting radial displacement of said jaws, said setting sleeve being axially displaceable relative to said guide sleeve, said setting sleeve having a number of generally axially extending radially inwardly facing surfaces, each of said radially outer surfaces of said jaw being in sliding contact with a corresponding one of said radially inwardly facing surfaces of said setting sleeve and the contacting said radially outer surfaces and said radially inwardly facing surfaces being inclined obliquely relative to the axis of said guide sleeve, wherein the improvement comprises that said guide jaws have elongated slots formed therein extending in parallel relation with the contacting said radially outer surfaces and radially inwardly facing surfaces, and retaining elements mounted in said setting sleeve and extending into said slots in said jaws for guiding said jaws during radial displacement, each said clamping jaw has a pair of oppositely facing radially extending sides extending generally in the axial direction of said guide sleeve and said slot extends completely through said clamping jaw between said radially extending sides, each clamping jaw has a leading end closer to the leading end of said guide sleeve and said slot extends through said leading end.

2. Clamping chuck, as set forth in claim 1, wherein said retaining elements extend through the slots in said clamping jaws and extend outwardly from said clamping jaws into said setting sleeve.

3. Clamping chuck, as set forth in claim 1, wherein said retaining elements include a pin-like section having a diameter corresponding substantially to the width of said slot and extending into said slot, and an axially extending section projecting from said second pin-like section into said setting sleeve.

4. Clamping chuck, as set forth in claim 1, wherein each said retaining element is a strip-like element having a thickness corresponding substantially to the width of the slot and extending through said slot.

5. Clamping chuck, as set forth in claim 1, wherein said setting sleeve is slidably displaceable on said guide sleeve, said guide sleeve is threaded along an axially extending section of the outer surface thereof spaced from said setting sleeve, a threaded sleeve in threaded engagement with said guide sleeve and being rotatable relative to said guide sleeve, said threaded sleeve being connected to said setting sleeve so that said threaded sleeve can be rotated relative to said setting sleeve and said guide sleeve so that the axial movement of said threaded sleeve effects the axial movement of said setting sleeve.

6. Clamping chuck, as set forth in claim 1, wherein a cover is secured to the leading end of said guide sleeve and extends around said setting sleeve for providing a closure of the space between said guide sleeve and said setting sleeve containing said clamping jaws.

7. Clamping chuck, as set forth in claim 1, wherein said retaining elements extend chordally of said setting sleeve through said slots in said clamping jaws.

* * * * *